United States Patent [19]

Viertel et al.

[11] 4,451,076

[45] May 29, 1984

[54] OUTER SUPPORT BRACKET FOR AUTOMOBILE SUN VISORS

[75] Inventors: Lothar Viertel, Saarlouis; Peter Kaiser, Wermelskirchen, both of Fed. Rep. of Germany

[73] Assignee: Gebr. Happich GmbH, Fed. Rep. of Germany

[21] Appl. No.: 360,552

[22] Filed: Mar. 22, 1982

[30] Foreign Application Priority Data

Apr. 4, 1981 [DE] Fed. Rep. of Germany ....... 3113625

[51] Int. Cl.$^3$ ................................................. B60J 3/00
[52] U.S. Cl. .................................. 296/97 K; 248/274; 24/230.5 R
[58] Field of Search ............................ 296/97 K, 97 R; 248/274, 288.3; 24/241 R, 230.5 R, 231, 232 R, 233, 235

[56] References Cited

U.S. PATENT DOCUMENTS 3,096,061  7/1963  Bertell ............................ 248/288.3
3,399,923  9/1968  Bornefeld et al. ................ 296/97 R Primary Examiner—Robert R. Song
Attorney, Agent, or Firm—Ostrolenk, Faber, Gerb & Soffen

[57] ABSTRACT

The disclosure concerns an outer support bracket for use in the body of a vehicle for supporting the outer support shaft of a sun visor. The sun visor is supported by a swivel bearing at one end and by an outer support shaft at the other end. The bracket for the latter includes a base part secured to the vehicle body and a head part swingably mounted to the base part. A support opening extending across the head part receives the outer support shaft of the sun visor body and the head part is movable for reorienting the support opening to the orientation of the outer support shaft. A radially positioned introduction slot permits introduction of the support shaft into the support opening. The head part is swingable on the base part around a semi-cylindrically curved set of cooperating surfaces on the head part and base part and the head part projects from within the base part to the exterior of the base part through an opening in the base part.

22 Claims, 4 Drawing Figures

OUTER SUPPORT BRACKET FOR AUTOMOBILE SUN VISORS

BACKGROUND OF THE INVENTION

The present invention relates to an outer support bracket for an automobile sun visor, and particularly a bracket with a slot for receiving the outer support shaft at the end of the visor away from its swivel mount.

Such an outer support bracket serves for supporting one end of a sun visor which is swingably arranged in front of the windshield of an automobile. The bracket also enables the sun visor to be swung away on its swivel mount for the sun visor to the side window. The support bracket is also known as a catch support, since it only supports the sun visor outer support shaft at the region of the end of the sun visor away from the swivel mount when the sun visor body is in front of the windshield.

In an outer support bracket, it is important that the bracket opening for the outer support shaft and the entrance slot for the bracket opening be exactly aligned with the sun visor outer support shaft. Otherwise, unimpeded removal from and reinsertion of the outer support shaft into the support opening is not assured. Exact alignment of the support opening and the outer support shaft is also made difficult by the manufacturing tolerances of the rough body and also by the fact that the region of the vehicle body above the windshield, to which the outer support bracket for a sun visor is to be fastened, may be curved to a greater or lesser extent. The curved development of the vehicle body necessitates corresponding adaptation of the mounted side of the outer support bracket. Thus, outer support brackets are generally developed as right-hand and left-hand types, which makes manufacture, storage, as well as assembly difficult and also expensive. However, even with the development of right-hand and left-hand outer support brackets, compensation for existing manufacturing tolerances in the rough body cannot be achieved, so that it is still necessary to align the support opening of the outer support bracket with the outer support shaft in every installation.

SUMMARY OF THE INVENTION

The object of the invention is to develop an outer support bracket for a vehicle sun visor such that alignment between its support opening and the outer support shaft of a sun visor can be obtained rapidly and easily.

According to the invention, the head part of the support bracket, which receives the support shaft of the sun visor, is a separate part from and is arranged swingably on the foot part of the sun visor which is mounted to the vehicle body. In this connection it is generally sufficient, except for special cases, if the head part can merely be swung parallel to the axial alignment of the support opening.

The two part development of the outer support bracket permits displacement of the head part in the axial plane enabling the support opening to be rapidly and simply brought into alignment with the outer support shaft of the sun visor, whereby skewed orientation of the outer support shaft in the support opening is avoided. The displaceability of the outer support bracket in accordance with the invention, however, not only serves to compensate for manufacturing tolerances of the rough body but it also makes it possible to avoid providing left-hand and right-hand type brackets. Further, the head part can be clamped at the selected orientation with respect to the base part. The invention has the further advantage that the base part is replaceably connected with the head part so that possibilities exist for use in different types of vehicles by merely replacing the base part of the outer support bracket.

Other objects and features of the invention will be apparent in further detail of an illustrative embodiment shown in the drawings.

DESCRIPTION OF A PREFERRED EMBODIMENT

Figure 1:
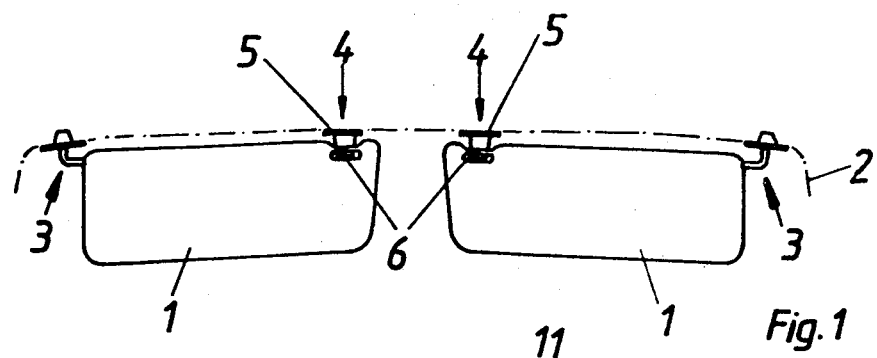
FIG. 1 shows an arrangement of sun visors in a vehicle.
Figure 2:
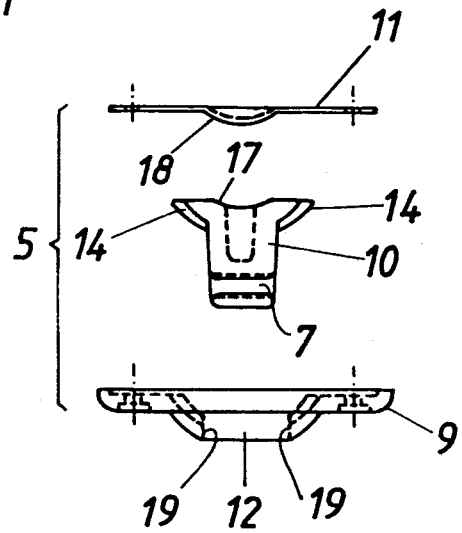
FIG. 2 is an exploded elevational view of an outer support bracket according to the invention.

FIG. 1 shows an arrangement of two sun visors 1 on a vehicle body 2 above the windshield (not shown). Each visor 1 has at one end a swivel bearing 3 and at the other end an outer support 4 which is comprised of an outer support bracket 5 which can be fastened to the vehicle body 2 at an outer support shaft 6. The outer support shaft 6 is a component part of the sun visor 1.

The outer support bracket 5 has a support opening 7 in the below described head part for supporting the outer support shaft 6 of the sun visor 1. A radially extending introduction slot 8 opens up into the opening 7. The introduction slot 8 permits removal of the outer support shaft 6 from the support opening 7 when the sun visor is to be swung toward the side window of the car and, of course, upon return of the sun visor to the front window, the slot 8 permits reinsertion of the outer support shaft 6 into the support opening 7.

Figure 3:
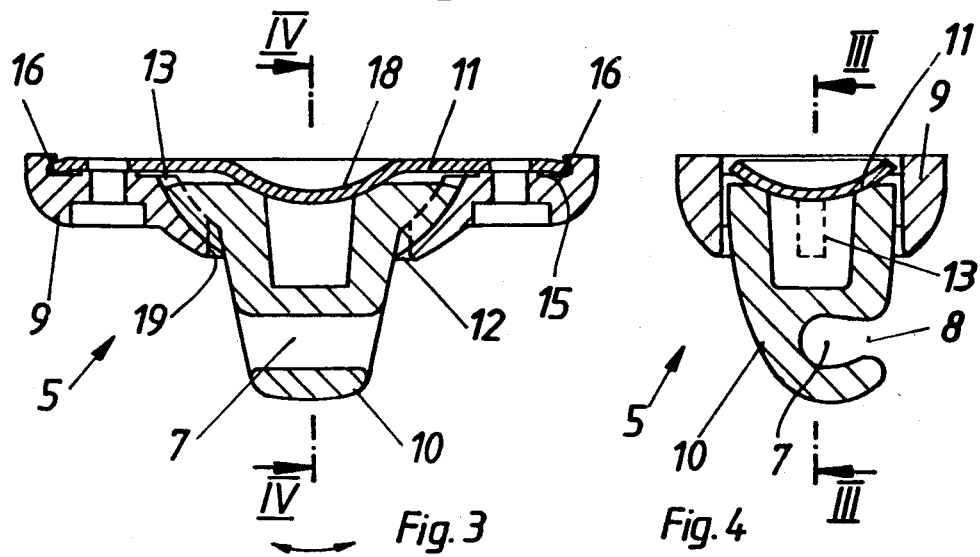
FIG. 3 shows the outer support bracket of FIG. 2 on a larger scale in section along the line III—III of FIG. 4.
Figure 4:
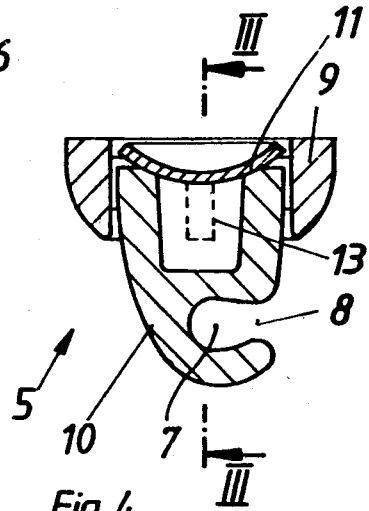
FIG. 4 is a section of the bracket along the line IV—IV of FIG. 3.

The outer support bracket 5 further comprises a base part 9, the top surface of which can be fastened to the vehicle body 2, comprises a head part 10 and a clamping plate 11. The base part 9 is an injection molding of plastic and has a central axial opening 12 through which the lower part of the head part 10, and particularly the support opening 7 thereon, are passed. Adjoining the opening 12, in the position of use of the outer support bracket 5, as shown in FIG. 3, there are bearing surfaces which are curved to the left and right. In particular, together they define a semi-cylindrical curve, which guides the head part to swing about an axis, and particularly parallel to the axial direction of extension of the opening 7. Each such surface has a narrow width, curved guide groove 13 formed in it, into which a respective guide projection 14 arranged on the head part 10 engages.

The head part 10 is an injection molding of plastic and has a tapered lower end region in which the support opening 7 is formed. This end region passes through the opening 12 in the base part 9. The head part also has a thickened end upper region with opposite, laterally projecting guide projections 14. The thickened end region of the head part rests against the support surfaces of the base part 9 while the projections 14 are received in the curved guide grooves 13. In the alternative, the projections could be on the base part while the groove is defined in the head part.

The clamping plate 11 is a flat metal strip plate, resilient and including a projection 18, described below.

Upon assembly, the head part 10 is first placed through the opening 12 in the base part 9. Then the head part 10 is fixed with respect to the base part 9 by means of the clamping plate 11, which is received in a recess 15 at the side of the base part 9 that is attached to the vehicle body and is held in the recess by a detent comprising undercut walls 16. The head part 10 has a cup-shaped depression 17 within which a correspondingly shaped projection 18 of the clamping plate 11 rests. The top of the head part away from its projection 18 is spaced away from the clamping plate and even curves down at its edges, as seen in FIG. 3, to avoid contact between and blocking of head part motion between the top of the head part and the clamping plate 11. The displaceability of the head part 10 along the directions indicated by the curved, double-headed arrow in FIG. 3 is limited by the inner walls 19 of the central opening 12, as these walls form end stops. Experiments, however, have shown that the displaceability of the head part 10 is in any event large enough to be able to avoid the need for special left-hand and right-hand embodiments and to be able to compensate for manufacturing tolerances. Unintended displacement of the head part 10 with respect to the base part 9 is reliably prevented by the spring force of the clamping plate 11 the depression 18 of which acts on the head part 10 so that after initial adjustment of the head part 10, skew-free insertion and removal of the outer support shaft 6 of the sun visor 1 into and out of the support opening 7 is always assured.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An outer support bracket for receiving and supporting and being separable from an outer support shaft of a vehicle sun visor, wherein the outer support shaft and the outer support bracket are spaced from a swivel bearing for the sun visor; the bracket comprising a base part for being fastened on the body of a vehicle and a head part separate from and swingably mounted on the base part;

the head part having a support opening in it shaped and oriented for receiving in it the outer support shaft of a sun visor and for the outer support shaft in the support opening to extend across the head part, and a slot in the head part for providing access into the support opening for the outer support shaft of a sun visor as the sun visor is swiveled around its swivel bearing for selectively swinging the outer support shaft into and out of the support opening; and the head part being swingable with respect to the base part for orienting the support opening for separably receiving and supporting the outer support shaft of a sun visor.

2. The outer support bracket of claim 1, further comprising a clamping element on the base part for clamping the head part in an adjusted swing position with respect to the base part.

3. The outer support bracket of claim 2, wherein the base part and the head part both respectively comprise a plastic injection molding and the clamping element is comprised of a sheet metal strip shaped for being attached to the base part and for being pressed against the head part for clamping the head part.

4. The outer support bracket of claim 2, wherein the base part has a detent on it for the clamping element and the clamping element is locked to the base part at the detent, and the clamping element rests against the head part under pre-tension of the clamping element.

5. The outer support bracket of claim 1, wherein both of the base part and the head part are respectively comprised of a plastic injection molding.

6. The outer support bracket of claim 1, wherein the head part is mounted for being swung generally parallel to the axial direction of extension of the support opening with the outer support shaft in the support opening.

7. The outer support bracket of claim 6, further comprising a clamping element on the base part for clamping the head part in an adjusted swing position with respect to the base part.

8. The outer support bracket of claim 7, wherein the base part and the head part both respectively comprise a plastic injection molding and the clamping element is comprised of a sheet metal strip shaped for being attached to the base part and for being pressed against the head part for clamping the head part.

9. The outer support bracket of claim 8, wherein the base part has a detent on it for the clamping element and a clamping element being locked to the base part at the detent, and the clamping element resting against the head part under pre-tension of the clamping element.

10. The outer support bracket of claim 7, wherein the base part has a detent on it for the clamping element and the clamping element is locked to the base part at the detent, and the clamping element rests against the head part under pre-tension of the clamping element.

11. The outer support bracket of claim 10, wherein the base part has a side facing toward the vehicle body and the clamping element is attached at that side of the base part.

12. The outer support bracket of claim 6, wherein the base part has an opening through it and the head part extends through the opening in the base part; the opening in the base part being oriented for the head part support opening to be spaced out from the vehicle body and out from the base part.

13. The outer support bracket of claim 12, wherein the base part includes a rounded support surface facing toward the vehicle body and the head part includes a portion resting on the rounded support surface, whereby the head part may be rotated over the support surface for adjusting the orientation of the head part with respect to the base part.

14. The outer support bracket of claim 13, wherein the support surface has a guide groove defined in it and extending along the direction of swinging motion of the head part with respect to the base part, and the head part has a guide projection on it for being received in the guide groove.

15. The outer support bracket of claim 13, wherein one of the support surface and the head part has a guide groove defined in it and extending along the direction of swinging motion of the head part with respect to the base part and the other of the support surface and the head part has a guide projection on it for being received in the guide groove, for guiding swinging motion of the head part with respect to the base part.

16. The outer support bracket of claim 13, wherein the opening through the base part is in the rounded support surface.

17. The outer support bracket of either of claims 13 or 16, wherein the rounded support surface is concavely, semi-cylindrically shaped for guiding motion of the head part around an axis of the support surface.

18. The outer support bracket of claim 17, wherein the support surface has a guide groove defined in it and extending along the direction of swinging motion of the head part with respect to the base part, and the head part has a guide projection on it for being received in the guide groove.

19. The outer support bracket of claim 18, further comprising a clamping element on the base part for clamping the head part in an adjusted swing position with respect to the base part.

20. The outer support bracket of claim 17, wherein one of the support surface and the head part has a guide groove defined in it and extending along the direction of swinging motion of the head part with respect to the base part and the other of the support surface and the head part has a guide projection on it for being received in the guide groove, for guiding swinging motion of the head part with respect to the base part.

21. The outer support bracket of claim 20, further comprising a clamping element on the base part for clamping the head part in an adjusted swing position with respect to the base part.

22. In combination, the outer support bracket of any of claims 1, 2, 6, 7, 12 or 13 and a sun visor;

the sun visor comprising a sun visor body, a swivel bearing at one edge of the sun visor body, and the swivel bearing being adapted for mounting to the body of the vehicle, whereby the sun visor body may be swiveled with respect to the vehicle body at the swivel bearing;

an outer support shaft on the sun visor body and spaced from the swivel bearing and being positioned and oriented for insertion in the support opening of the head part of the outer support bracket; the swivel bearing and the support opening in the outer support bracket being so shaped and positioned as to permit the sun visor body to be swiveled around the swivel bearing and the outer support shaft when the outer support shaft is in the support opening.

* * * * *